A. E. BAWTREE.
MACHINE FOR MANIPULATING CONTAINERS.
APPLICATION FILED DEC. 21, 1918.

1,324,295.

Patented Dec. 9, 1919.
2 SHEETS—SHEET 1.

UNITED STATES PATENT OFFICE.

ALFRED EDWIN BAWTREE, OF SUTTON, ENGLAND, ASSIGNOR TO HADFIELDS (MERTON) LIMITED, OF MITCHAM, ENGLAND.

MACHINE FOR MANIPULATING CONTAINERS.

1,324,295.      Specification of Letters Patent.      Patented Dec. 9, 1919.

Application filed December 21, 1918. Serial No. 267,832.

*To all whom it may concern:*

Be it known that I, ALFRED EDWIN BAWTREE, a subject of the King of Great Britain, residing at 7 Manor Park Road, Sutton, Surrey, England, have invented new and useful Improved Machines for Manipulating Containers, of which the following is a specification.

My invention consists of mechanism for manipulating any articles of which a quantity uniform in size and shape have to be handled while being coated with protective or decorative fluid and in particular for handling porous containers while being coated internally or externally with proofing fluid.

To carry out my invention I cause the article to be treated to be rotated while held in a suitable continuously rotating chuck during which rotation the fluid or composition is applied either by hand or in an automatic manner by brushing, spraying or any other convenient method of treatment. A chamber behind the chuck receives from a chute, feeding wheel, hopper or other suitable device the articles for subsequent treatment. A reciprocating plunger drives the articles from this chamber into the chuck, thereby automatically driving out the article which has been treated while in the chuck.

The accompanying drawings illustrate machines made in accordance with this invention.

Figure 1:
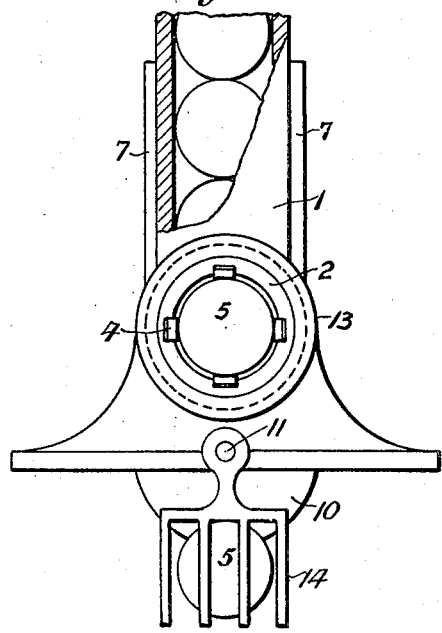
Figure 2:
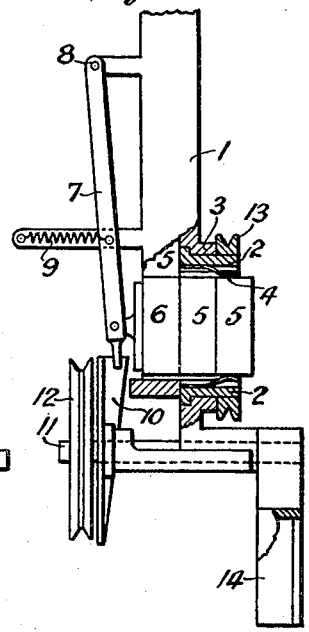
Figure 3:
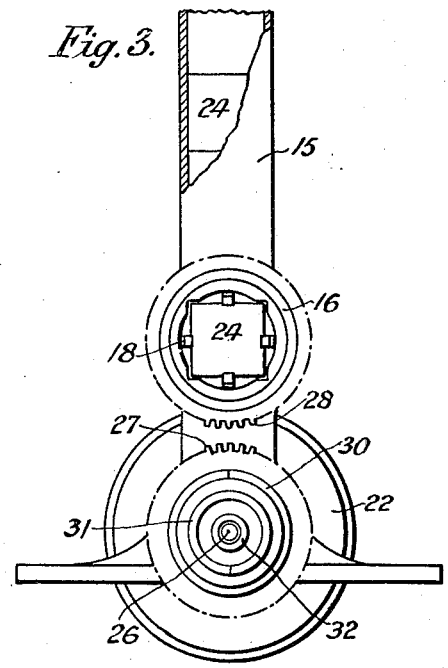
Figure 4:
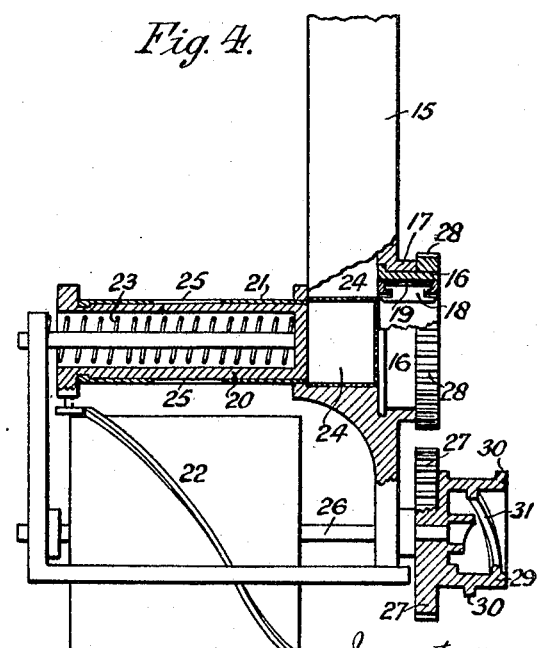
Figure 5:
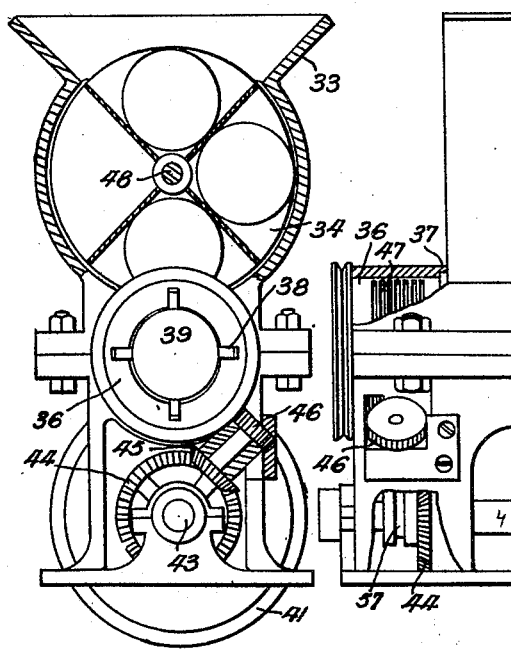

Figure 1 is a front elevation and Fig. 2 a part sectional side elevation of a machine adapted for use with shallow circular containers. Fig. 3 is a part sectional front elevation and Fig. 4 is a part sectional side elevation for use with containers of square cross section. Fig. 5 is a front elevation and Fig. 6 a part sectional side elevation for use with deep cylindrical containers.

The containers in the machines shown in Figs. 1 and 2, and Figs. 5 and 6, are sprayed interiorly while in the machine shown in Figs. 3 and 4, the containers are sprayed exteriorly.

In Figs. 1 and 2, 1 is a hopper in which are containers and 2 is a chuck capable of turning in a bearing 3 and shaped interiorly to receive shallow circular containers. In the chuck 2 are springs 4 which grip a container 5 pushed into the chuck by a plunger 6, the containers 5 falling one at a time in front of the plunger from the hopper 1. The plunger 6 is carried at the ends of arms 7 pivoted at 8 and connected to a spring 9, and is reciprocated by means of a cam 10 which moves it from left to right against the action of the spring 9 and causes it to push a container 5 into the chuck 2. The cam 10 is mounted on a shaft 11 driven through a driving pulley 12 and similarly the chuck 2 is driven by a pulley 13. On the shaft 11 is an arm 14 adapted to receive a container 5 when it is pushed out of the chuck. While the container is rotated it is sprayed or otherwise coated in any convenient manner.

In Figs. 3 and 4, 15 is a hopper through which articles are fed to a chuck 16 capable of turning in bearings 17 and shaped interiorly to receive containers of square cross section. In the chuck 15 are dogs 18 pressed outward by springs 19. A plunger 20 having a sleeve 21 is reciprocated by means of a cam 22 which moves it from right to left against the action of a spring 23. Containers 24 from the hopper 15 fall in front of the plunger 20 which under the action of the spring 23 passes into the container and pushes it through the chuck. When the plunger has completed its stroke the dogs 18 enter slots 25 in the sleeve 21. The container at the same time is secured to the plunger by the frictional contact between the container and the sleeve 21; both the sleeve and the container rotate with the chuck. The container is then exteriorly sprayed. The cam 22 is mounted on a shaft 26 on which is a toothed wheel 27 and on the chuck 16 is another toothed wheel 28, both wheels being driven by gearing not shown in the drawings. On the shaft 26 is a cam 29 having three acting surfaces, namely, an outer spiral 30, an inner spiral 31 and a central tube 32 which has a spiral face at its end. These surfaces may be used to actuate mechanism for traversing a spraying jet for coating the articles or for actuating mechanism for removing the articles after treatment.

Figure 6:
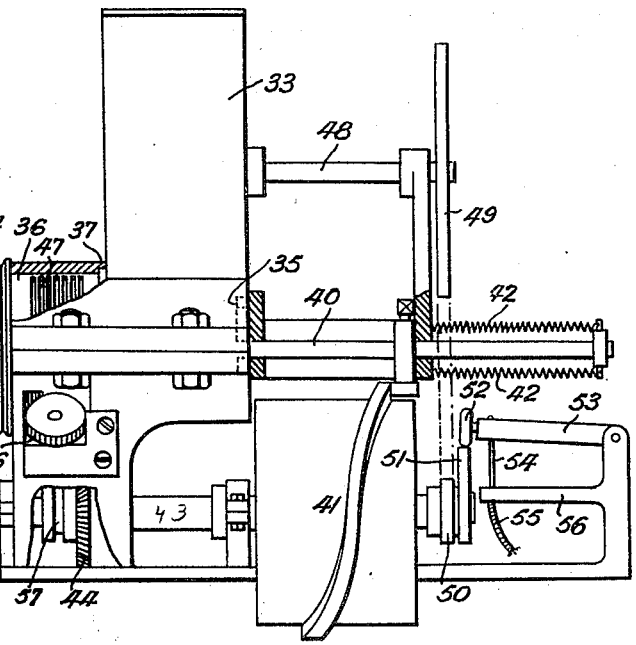

In Figs. 5 and 6, 33 is a hopper in which is a revolving wheel 34 which feeds containers to a space between a plunger 35 and a chuck 36 which is capable of turning in bearings 37 and shaped interiorly to receive deep circular containers. In the chuck 36 are springs 38 which grip a container 39 pushed into the chuck by the plunger 35. The plunger 35 is mounted on an arm 40 and is reciprocated by a cam 41 which moves it from left to right against the action of springs 42. As the cam 41 turns, the springs 42 cause the plunger to push a container into the chuck 36. The cam 41 is mounted upon a shaft 43 upon which is a bevel wheel 44 in mesh with a bevel wheel 45. On the same shaft as the bevel wheel 45 is a worm wheel 46 engaging with a worm 47. The wheel 34 is mounted on a shaft 48 having on it a pulley 49 driven from another pulley 50 on the cam shaft 43 and on the cam shaft 43 is another cam 51 engaging with a roller 52 on a pivoted arm 53, to which is connected the end of the inner wire 54 of an antennous flexible connection, by means of which the spraying mechanism can be actuated, the outer tube 55 of the connection engaging with the fixed arm 56. 57 is a clutch by which the bevel wheel 44 can be thrown out of gear with the other bevel wheel 45 thereby stopping the feed of the machine without stopping the rotation of the clutch.

What I claim is:—

1. A machine for manipulating containers while being coated, comprising a chuck, a hopper, a chamber in rear of the chuck and below the hopper into which the containers drop one at a time, means for rotating the chuck, a plunger in rear of the chuck and adapted to feed containers into it, a spring connected to the plunger, a cam adapted to move the plunger in one direction against the action of the spring, a shaft on which said cam is mounted and which is parallel with the line of movement of the plunger, another cam on said shaft adapted to actuate spraying devices, and means for actuating said shaft.

2. A machine for manipulating containers while being coated, comprising a chuck, means for rotating the chuck, a plunger adapted to feed containers into the chuck, a spring connected to the plunger, a cam adapted to move the plunger against the action of the spring, a shaft on which said cam is mounted, gearing connecting said shaft with the chuck, a clutch for connecting said shaft with the chuck, and means for rotating said shaft.

3. A machine for manipulating containers while being coated comprising a chuck, means for rotating the chuck, a plunger adapted to feed containers into the chuck, a spring connected to the plunger, a cam adapted to move the plunger against the action of the spring and mounted upon a shaft, a bevel wheel on the shaft, another bevel wheel in mesh with the other bevel wheel and mounted on a second shaft, a worm wheel in the second shaft in gear with a worm on the chuck, a clutch adapted to move one bevel wheel out of mesh with the other, and means for turning the cam shaft.

In testimony that I claim the foregoing as my invention I have signed my name this 3rd day of December, 1918.

ALFRED EDWIN BAWTREE.